US011514790B2

(12) United States Patent
Grace et al.

(10) Patent No.: US 11,514,790 B2
(45) Date of Patent: Nov. 29, 2022

(54) COLLABORATIVE PERCEPTION FOR AUTONOMOUS VEHICLES

(71) Applicant: GM Cruise Holdings LLC, San Francisco, CA (US)

(72) Inventors: Nestor Grace, San Francisco, CA (US); Diego Plascencia-Vega, San Francisco, CA (US); Dogan Gidon, Berkeley, CA (US); Mohamed Mostafa Elshenawy, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 286 days.

(21) Appl. No.: 16/830,548

(22) Filed: Mar. 26, 2020

(65) Prior Publication Data
US 2021/0304607 A1  Sep. 30, 2021

(51) Int. Cl.
*G08G 1/16* (2006.01)
*G08G 1/01* (2006.01)
*H04W 4/46* (2018.01)
*H04L 67/12* (2022.01)
(Continued)

(52) U.S. Cl.
CPC ........... *G08G 1/163* (2013.01); *G08G 1/0112* (2013.01); *H04W 4/46* (2018.02)

(58) Field of Classification Search
CPC ..................................................... H04L 67/12
See application file for complete search history.

(56) References Cited

U.S. PATENT DOCUMENTS 10,777,084 B1 * 9/2020 Vora ......................... G08G 1/22
2012/0290146 A1  11/2012 Dedes et al.
(Continued)

FOREIGN PATENT DOCUMENTS

JP       2020129336 A  *  8/2020

OTHER PUBLICATIONS

Chen, Q. et al., "Cooper: Cooperative Perception for Connected Autonomous Vehicles based on 3D Point Clouds," Department of Computer Science and Engineering, University of North Texas, USA; 11 pages (May 13, 2019).
(Continued)

*Primary Examiner* — Aniss Chad
*Assistant Examiner* — Madison R Hughes
(74) *Attorney, Agent, or Firm* — Akona IP PC

(57) ABSTRACT

Collaborative perception is based on recognition that a fleet of AVs and stationary infrastructure objects equipped with sensors may be configured to communicate with one another in sharing their sensor data, thus benefiting from collaborative perception, rather than being limited to their individual perception. Three specific scenarios of collaborative perception are disclosed. The first scenario relates to two AVs in the vicinity of one another exchanging complexity scores indicative of their respective environments. The second scenario relates to an AV detecting that it has a blind spot and seeking other AVs or infrastructure objects to provide information indicative of the environment in the blind spot. The third scenario relates to providing infrastructure objects equipped with sensors in appropriate locations so that, when an AV is in the vicinity of such objects, the AV may receive information from their sensors.

20 Claims, 8 Drawing Sheets

(51) Int. Cl.
    *H04W 4/44*    (2018.01)
    *H04W 4/38*    (2018.01)

(56) References Cited

U.S. PATENT DOCUMENTS

| | | | |
|---|---|---|---|
| 2015/0178998 A1* | 6/2015 | Attard | G07C 5/008 |
| | | | 701/23 |
| 2018/0208195 A1* | 7/2018 | Hutcheson | G08G 1/163 |
| 2020/0160722 A1* | 5/2020 | Brugman | G07C 5/08 |
| 2020/0372795 A1* | 11/2020 | Szilagyi | H04W 4/44 |

OTHER PUBLICATIONS

Saxena, S., et al., "Multiagent Sensor Fusion for Connected & Autonomous Vehicles to Enhance Navigation Safety," The Robotics Institute, School of Computer Science, Carnegie Mellon Univsersity, Pittsburgh, USA; 6 pages.

* cited by examiner

COLLABORATIVE PERCEPTION FOR AUTONOMOUS VEHICLES

TECHNICAL FIELD OF THE DISCLOSURE

The present disclosure relates generally to autonomous vehicles (AVs) and, more specifically, to devices and methods for collaborative perception among AVs or among AVs and infrastructure objects.

BACKGROUND

AV sensing and perception have inherent limitations due to the hardware involved (e.g., positions of the sensors, sensor modes, calibration, etc.) and the environment in which they operate (e.g., steep hills, oddly shaped roads, objects blocking the field of view of the sensors, etc.). As a result, sometimes AVs have regions of obstructed visibility (i.e., blind spots), which may compromise their ability to operate safely.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
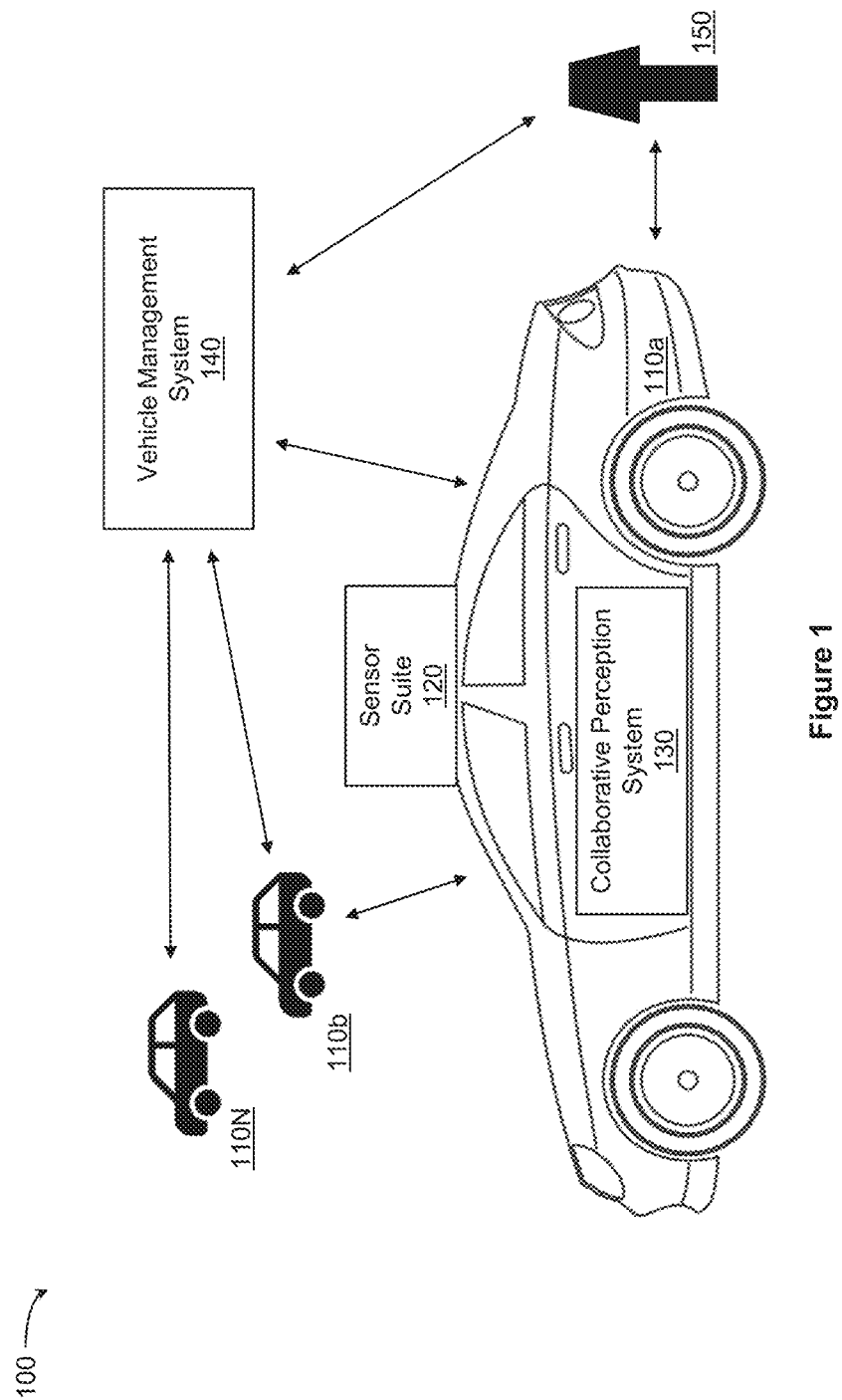
FIG. 1 is a block diagram illustrating a system including an example AV in which at least some aspects of collaborative perception according to some embodiments of the present disclosure may be implemented.

The systems, methods and devices of this disclosure each have several innovative aspects, no single one of which is solely responsible for the all of the desirable attributes disclosed herein. Details of one or more implementations of the subject matter described herein are set forth below and the accompanying drawings.

For purposes of illustrating collaborative perception, proposed herein, it might be useful to first understand phenomena that may come into play when AVs are involved. The following foundational information may be viewed as a basis from which the present disclosure may be properly explained. Such information is offered for purposes of explanation only and, accordingly, should not be construed in any way to limit the broad scope of the present disclosure and its potential applications.

Vehicle automation has been suggested as a means to increase vehicle safety almost as long as cars have been in existence—experiments on autonomy in cars have been conducted since at least the 1920s. Only recently, though, has computer technology advanced enough to make true vehicle automation possible.

AV sensing and perception is based on using a sensor suite with sensors such as radar sensors, light detection and ranging (LIDAR) sensors, and cameras to detect information indicative of the environment surrounding an AV. Similar to human drivers, AV sensor suites may encounter situations in which their visibility of one or more regions around them is obstructed. As described above, such situations may compromise AVs' ability to operate safely.

Embodiments of the present disclosure are based on recognition that, unlike human drivers, a fleet of AVs, as well as, optionally, stationary and/or mobile infrastructure objects equipped with sensors may be configured to communicate with one another in sharing their sensor data, thus benefiting from collaborative perception, rather than being limited to their individual perception. Three specific scenarios of collaborative perception are disclosed herein. The first scenario relates to two AVs in the vicinity of one another exchanging information, referred to herein as "complexity scores," indicative of their respective environments. The second scenario relates to an AV detecting that it has a blind spot and seeking other AVs or infrastructure objects to provide information indicative of the environment in the blind spot. The third scenario relates to providing infrastructure objects equipped with sensors in appropriate locations so that, when an AV is in the vicinity of such objects, the AV may receive information from their sensors. In any of these scenarios, an AV may then adapt its driving strategy in view of the information received from one or more other AVs or infrastructure objects. Implementing one of more of these scenarios in, e.g., an urban environment, may provide significant improvements in terms of increasing the AVs' ability to operate safely.

As will be appreciated by one skilled in the art, aspects of the present disclosure, in particular aspects of collaborative perception, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems. For example, a computer program implementing various aspects of collaborative perception as described herein may be downloaded to the existing AVs and/or their controllers, etc., or be stored upon manufacturing of these devices and systems. In another example, a computer program implementing various aspects of collaborative perception as described herein may be downloaded to the existing infrastructure objects in an urban environment and/or their controllers, etc., or be stored upon manufacturing of these objects and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the present disclosure, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. If used, the terms "substantially," "approximately," "about," etc., may be used to generally refer to being within +/−20% of a target value, e.g., within +/−10% of a target value, based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" or notation "A/B/C" mean (A), (B), (C), (A and B), (A and C), (B and C), or (A, B, and C).

Other features and advantages of the disclosure will be apparent from the following description and the claims.

Example AV

FIG. 1 is a block diagram illustrating a system 100 including an example AV in which at least some aspects of collaborative perception according to some embodiments of the present disclosure may be implemented. As shown in FIG. 1, the system 100 may include a fleet of AVs 110, including AV 110a, AV 110b, and AV 110N. For example, a fleet of AVs may include a number N of AVs, e.g., AV 110a through AV 110N. A single AV in the fleet is referred to herein as AV 110, and the fleet of AVs is referred to collectively as AVs 110.

Taking the AV 110a as an example of AVs 110, as shown in FIG. 1, the AV 110a may include a sensor suite 120 and a collaborative perception system 130. Together, the sensor suite 120 and the collaborative perception system 130 may be used to collect and exchange data for enhancing perception of a single AV 110 with that of other AVs 110 and/or of one or more infrastructure objects 150. The sensor suite 120 and the collaborative perception system 130 are described further in relation to FIGS. 2 and 3, respectively.

The AVs 110 may be communicatively connected to (i.e., configured to exchange data with) a vehicle management system 140 and, optionally, one or more infrastructure objects such as an infrastructure object 150, as shown in FIG. 1 (communicative connections between various elements are shown in FIG. 1 with double-sided arrows between the elements and may be realized, e.g., using a public network, such as the Internet). As shown in FIG. 1, each of the AVs 110 may be communicatively connected with the vehicle management system 140, and the AVs 110 may be communicatively connected with one another. In some embodiments, the vehicle management system 140 and the infrastructure object 150 may also be communicatively connected, as also shown in FIG. 1. The vehicle management system 140 may be configured to provide any of the AVs 110 with information that can assist the AVs 110 in obtaining data from other AVs 110 and/or from the infrastructure object 150 in order to enable the AVs 110 with collaborative perception. The vehicle management system 140 and the infrastructure object 150 are described further in relation to FIGS. 4 and 5, respectively.

In various embodiments, any of the AVs 110 may be fully autonomous automobiles, but may additionally or alternatively be any semi-autonomous or fully autonomous vehicles, e.g., boats, unmanned aerial vehicles, driverless cars, etc. Additionally, or alternatively, any of the AVs 110 may be a vehicle that switches between a semi-autonomous state and a fully autonomous state and thus, any of the AVs 110 may have attributes of both a semi-autonomous vehicle and a fully autonomous vehicle depending on the state of the vehicle.

The AV 110 may include one or more of a throttle interface that controls an engine throttle, motor speed (e.g., rotational speed of electric motor), or any other movement-enabling mechanism; a brake interface that controls brakes of the AV (or any other movement-retarding mechanism);

and a steering interface that controls steering of the AV (e.g., by changing the angle of wheels of the AV). The AV 110 may additionally or alternatively include interfaces for control of any other vehicle functions; e.g., windshield wipers, headlights, turn indicators, air conditioning, etc. The AV 110 may have various internal and external lights. For example, the AV 110 may have one or more of headlights, fog lights, high beams, running lights, brake lights, tail lights, license plate lights, external displays, interior lights, etc.

Example Sensor Suite

Figure 2:
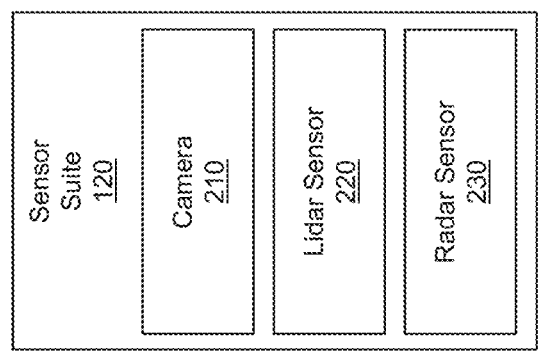
FIG. 2 is a block diagram illustrating a sensor suite according to some embodiments of the present disclosure.

FIG. 2 is a block diagram illustrating details of the sensor suite 120 according to some embodiments of the present disclosure. In various embodiments, the sensor suite 120 may include multiple types of sensors, each of which may have different attributes and advantages. Combining data from many multiple sensors and different sensor types allows the AV 110 to obtain a more complete view of its environment and allows the AV 110 to learn about its environment in different conditions. For example, combining (or fusing) data from many multiple sensors and different sensor types of the sensor suite 120 allows obtaining locations and properties (e.g., heights or other dimensions, velocities, etc.) of the objects surrounding the AV 110. The collaborative perception system 130 may share information obtained by the sensor suite 120 with other AVs 110 to enhance their perception.

In general, the sensor suite 120 may include a computer vision ("CV") system, localization sensors, and driving sensors. In some embodiments, as shown in FIG. 2, the sensor suite 120 may include a camera 210, a LIDAR sensor 220, and a radar sensor 230. The camera 210 may be configured to capture images of the environment around the AV 110. In some embodiments, the sensor suite 120 may include multiple cameras 210 to capture different views, e.g., a front-facing camera, a back-facing camera, and side-facing cameras. In some embodiments, the cameras 210 may be implemented using high-resolution imagers with fixed mounting and field of view. The LIDAR sensor 220 may be configured use reflected laser light for measuring distances to objects in the vicinity of the AV 110. The LIDAR sensor 220 may be a scanning LIDAR that can provide a point-cloud of the region scanned. In various embodiments, the LIDAR sensor 220 may have a fixed field of view or a dynamically configurable field of view. The radar sensor 230 may be configured to use reflected radio waves for measuring ranges and speeds of objects in the vicinity of the AV 110. In various embodiments, the radar sensor 230 may be implemented using a scanning radar with a fixed field of view or a dynamically configurable field of view. Radar sensors 230 may include articulating radar sensors, long-range radar sensors, short-range radar sensors, or any combination thereof.

In other embodiments, different and/or additional components may be included in the sensor suite 120. For example, while LIDAR and radar sensors 220, 230 are some examples of time-of-flight (TOF) sensors, in some embodiments, other types of TOF sensors, such as TOF cameras, infrared depth sensors, three-dimensional (3D) scanners, structured light scanners, or other types of ranging techniques may be used in the sensor suite 120 in addition to, or instead of, LIDAR and/or radar sensors. In another example, the sensor suite 120 may also include photodetectors, sonar sensors, Global Positioning System (GPS), wheel speed sensors, inertial measurement units (IMUS), accelerometers, microphones, strain gauges, pressure monitors, barometers, thermometers, altimeters, ambient light sensors, etc. Further, while one camera 210, one LIDAR sensor 220, and one radar sensor 230 are shown in FIG. 2, the sensor suite 120 may include more than one of each of these components, e.g., to capture the environment around the AV 110 from different positions and angles, and for redundancy. The sensors of the sensor suite 120 may be located in various positions in and around the AV 110. For example, the AV 110 may have multiple cameras located at different positions around the AV 110.

When used in the AV 110, the sensor suite 120 may be configured to produce perception data that can be used by an onboard computer to detect other cars, pedestrians, trees, bicycles, or objects within a road on which the AV 110 is traveling (such as construction and/or other objects that may impede movement of the vehicle), and indications surrounding the AV 110 (such as construction signs, stop indicators, and other street signs). An onboard computer (not shown in FIG. 1) may be connected to the sensor suite 120 and configured to control the AV 110 and to process sensed data from the sensor suite 120 and/or other sensors in order to determine the state of the AV 110. Based upon the vehicle state and programmed instructions, the onboard computer may modify or control behavior of the AV 110. In some embodiments, the onboard computer may be a general-purpose computer adapted for input/output (I/O) communication with vehicle control systems and the sensor suite 120, but may additionally or alternatively be any suitable computing device. In some embodiments, the onboard computer may be connected to the Internet via a wireless connection (e.g., via a cellular data connection). Additionally or alternatively, the onboard computer may be coupled to any number of wireless or wired communication systems.

Example Collaborative Perception System

Figure 3:
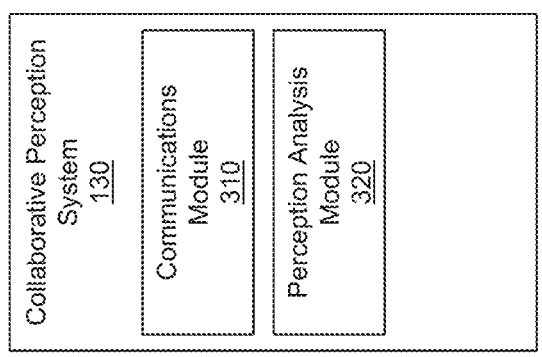
FIG. 3 is a block diagram illustrating a collaborative perception system according to some embodiments of the present disclosure.

FIG. 3 is a block diagram illustrating the collaborative perception system 130 according to some embodiments of the present disclosure. As shown in FIG. 3, the collaborative perception system 130 may include a communications module 310 and a perception analysis module 320. In alternative configurations, different and/or additional components may be included in the collaborative perception system 130. Further, functionality attributed to one component of the collaborative perception system 130 may be accomplished by a different component included in the collaborative perception system 130 or by a different system than what is illustrated in FIG. 3.

The communications module 310 may be configured to communicate with one or more of the vehicle management system 140, other AVs 110, and the infrastructure object 150, to obtain perception data gathered by these entities. For example, the communications module 310 may communicate with the vehicle management system 140 to obtain from the vehicle management system 140 indication of one or more AVs 110 and/or the infrastructure objects 150 in the vicinity of the AV 110a. Obtaining such an indication may then allow the AV 110a (e.g., the communications module 310 of the AV 110a) to communicate with the nearby AVs 110 and/or infrastructure objects 150 to obtain their perception data and to share with them the perception data gathered by the sensor suite 120 of the AV 110a.

In some embodiments, the communications module 310 may manage wired communications, such as electrical, optical, or any other suitable communication protocols (e.g., the Ethernet). In some embodiments, the communications module 310 may include an antenna configured to wirelessly transmit and/or receive radio frequency (RF) signals in accordance with any wireless standards or protocols, e.g., Wi-Fi, Long-Term Evolution (LTE), Global System for Mobile Communication (GSM), General Packet Radio Service (GPRS), or Universal Mobile Telecommunications System (UMTS), as well as any other wireless protocols that are designated as 3G, 4G, 5G, and beyond. In other embodiments, the communications module 310 may not include an antenna, but may include antenna interface circuitry (e.g., a matching circuitry, a connector and driver circuitry) to which an antenna may be coupled.

In some embodiments, the communications module 310 may include multiple communication chips. For instance, a first communication chip of the communications module 310 may be dedicated to shorter-range wireless communications such as Wi-Fi or Bluetooth, while a second communication chip may be dedicated to longer-range wireless communications such as GPS, GSM, GPRS, LTE, or others. In some embodiments, a first communication chip of the communications module 310 may be dedicated to wireless communications, while a second communication chip may be dedicated to wired communications.

The perception analysis module 320 may be configured to process the perception data gathered by the sensor suite 120 of the AV 110a, as well as the perception data obtained from the nearby AVs 110 and/or infrastructure objects 150. For example, the perception analysis module 320 may be configured to process sensor data (obtained by the sensor suite 120 of the AV 110) indicative of an environment surrounding the AV 110 to identify a region of obstructed visibility of the AV 110. In another example, the perception analysis module 320 may be configured to fuse sensor data obtained by the nearby AVs 110 and/or infrastructure objects 150 with its own sensor data to establish collaborative perception regarding the environment surrounding the AV 110. In some embodiments, as a part of data fusion to establish collaborative perception, the perception analysis module 320 may be configured to compute a complexity score indicative of the environment surrounding the AV 110 and/or process complexity scores obtained from other AVs 110 and/or infrastructure objects 150. In yet another example, the perception analysis module 320 may be configured to establish a driving strategy of the AV 110 based on the information indicative of the environment surrounding the AV 110 (which information may be based on the sensor readings of the sensor suite 120 of the AV 110 as well as on the perception data received from one or more other AVs 110 and/or infrastructure objects 150). Example methods with steps that may be implemented by the perception analysis module 320 are described with reference to FIGS. 9-11.

In some embodiments, perception data includes derived information from AVs 110 and/or infrastructure object 150, such as object polygons and/or object prediction trajectories. Such information may include object size, orientation, pose, absolute location, location relative to shared mapping data and/or AV 110 and/or infrastructure object 150, velocity, acceleration, predicted position(s), velocity, and acceleration, and the like. Similarly, results of processing of sensor readings may include the derived information. Receiving and transmitting derived information may be advantageous to limit bandwidth consumption by the communications module 310. It is to be understood that the perception analysis module 320 may also process the sensor data to generate the derived information which may be used in computing the complexity score, for example.

In some embodiments, the perception analysis module 320 may include any suitable processing device (e.g., one or more processing devices). As used herein, the term "processing device" or "processor" may refer to any device or portion of a device that processes electronic data from registers and/or memory to transform that electronic data into other electronic data that may be stored in registers and/or memory. In some embodiments, the perception analysis module 320 may include a processing device in the form of one or more digital signal processors (DSPs), application-specific ICs (ASICs), central processing units (CPUs), graphics processing units (GPUs), server processors, or any other suitable processing devices.

Example Vehicle Management System

Figure 4:
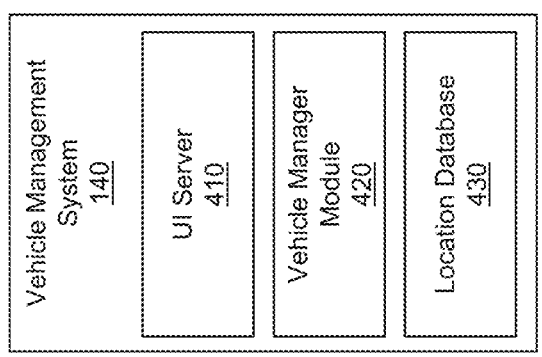
FIG. 4 is a block diagram illustrating a vehicle management system according to some embodiments of the present disclosure.

FIG. 4 is a block diagram illustrating the vehicle management system 140 according to some embodiments of the present disclosure. In some embodiments, the vehicle management system 140 may be configured to manage the fleet of AVs 110. For example, the vehicle management system 140 may manage a service that provides or uses the AVs 110, e.g., a service for collecting data for enhancing collaborative perception using the sensor suite 120. In some embodiments, the vehicle management system 140 may manage other services that provide or use the AVs 110, such as a service for providing rides to users using the AVs 110, or a service that delivers items using AVs (e.g., prepared foods, groceries, packages, etc.). In another example, the vehicle management system 140 may select an AV from a fleet of AVs 110 to perform a particular service or other task, and instruct the selected AV (e.g., the AV 110a) to drive to a particular area/location (e.g., an area/location where another AV 110 may need assistance in obtaining data indicative of an environment in its blind spot). In some embodiments, the vehicle management system 140 may also manage fleet maintenance tasks, such as fueling, inspecting, and servicing of the AVs 110.

As shown in FIG. 4, in some embodiments, the vehicle management system 140 may include a user interface (UI) server 410, a vehicle manager 420, and a location database 430. In alternative configurations, different and/or additional components may be included in the vehicle management system 140. Further, functionality attributed to one component of the vehicle management system 140 may be accomplished by a different component included in the vehicle management system 140 or by a different system than what is illustrated in FIG. 4.

The UI server 410 may be configured to communicate with client devices that provide a user interface to users. For example, the UI server 410 may be a web server that provides a browser-based application to client devices, or the UI server 410 may be a mobile app server that interfaces with a mobile app installed on client devices. The UI may enable the user to access a service of the vehicle management system 140, e.g., to request a ride from an AV 110, or to request a delivery from an AV 110. The UI may also enable a person in charge to access a service of the vehicle management system 140 related to collection of data for establishing collaborative perception, e.g., to request an AV 110 to drive to a particular location or a particular area to collect data using the sensor suite 120 of that AV so that the sensor data may be shared with another AV 110 to be processed by the collaborative perception system 130 of the other AV.

The vehicle manager 420 may be configured to manage and communicate with a fleet of AVs, including AVs 110a through 110N. The vehicle manager 420 may assign AVs 110 to various tasks and direct the movements of the AVs 110 in the fleet. For example, the vehicle manager 420 assigns a certain AV 110 to perform a service requested by a user to the UI server 410, e.g., to drive to a particular location or a particular area to collect and process data using the sensor suite 120 and the collaborative perception system 130. The vehicle manager 420 may instruct the AVs 110 to drive to other locations while not servicing a user, e.g., to improve geographic distribution of the fleet, to anticipate demand at particular locations, etc. The vehicle manager 420 may also be configured to instruct the AVs 110 to return to AV facilities for fueling, inspection, maintenance, or storage.

The location database 430 may be configured to store information that would allow the vehicle management system 140 to determine the locations of one or more AVs 110 and/or infrastructure objects 150 in the vicinity of a given AV 110 to enable sharing of the perception data between the AVs 110 and/or infrastructure objects 150 which are in the vicinity of one another and may, therefore, benefit from the collaborative perception of the substantially the same or complementary environments. While the location database 430 is shown as a component of the vehicle management system 140, in some embodiments, the location database 430 may be implemented outside of the vehicle management system 140, e.g., at a cloud server, etc.

Example methods with steps that may be implemented by the vehicle management system 140 are described with reference to FIGS. 9-11.

Example Infrastructure Object

In some embodiments, infrastructure objects such as traffic lights, lighting poles, traffic signs, post boxes, etc., may be configured to assist in enabling collaborative perception of the AVs 110. Infrastructure objects may also include installed sensors at a facility. To that end, infrastructure objects may include one or more sensors for detecting information indicative of their environment and may share that information with any of the AVs 110, possibly via the vehicle management system 140.

Figure 5:
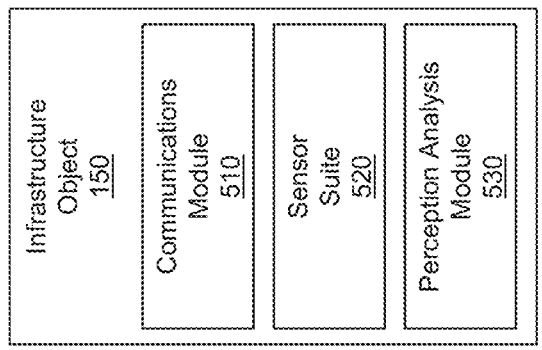
FIG. 5 is a block diagram illustrating an infrastructure object in which at least some aspects of collaborative perception according to some embodiments of the present disclosure may be implemented.

FIG. 5 is a block diagram illustrating an example infrastructure object 150 according to some embodiments of the present disclosure. As shown in FIG. 5, the infrastructure object 150 may include a communications module 510, a sensor suite 520, and a perception analysis module 530. In alternative configurations, different and/or additional components may be included in the infrastructure object 150. Further, functionality attributed to one component of the infrastructure object 150 may be accomplished by a different component included in the infrastructure object 150 or by a different system than what is illustrated in FIG. 5.

The communications module 510 may be configured to communicate with one or more of the vehicle management system 140 and the AVs 110 to share perception data gathered by the sensor suite 520 of the infrastructure object 150 with the vehicle management system 140 and/or the AVs 110. For example, the communications module 510 may receive an indication from the vehicle management system 140 to provide the perception data of the infrastructure object 150 to the vehicle management system 140 and/or one or more AVs 110 in the vicinity of the infrastructure object 150.

In various embodiments, the communications module 510 may be configured to manage wired and/or wireless communications. To that end, descriptions provided with respect to the communications module 310 of the collaborative perception system 130 of the AV 110 are applicable to the communications module 510 and, therefore, in the interests of brevity, are not repeated.

The sensor suite 520 may include multiple types of sensors, each of which may have different attributes and advantages. Combining data from many multiple sensors and different sensor types allows the sensor suite 520 to obtain a more complete view of the environment of the infrastructure object 150. The sensor suite 520 may be configured to produce perception data that can be used by the AV 110, e.g., by the perception analysis module 320 of the AV 110, to detect other cars, pedestrians, trees, bicycles, or objects within the environment surrounding the AV 110. The sensor suite 520 may be substantially similar to the sensor suite 120 of the AV 110 and, therefore, in the interests of brevity, descriptions provided with respect to the sensor suite 120 of the AV 110 are not repeated.

The perception analysis module 520 may be configured to process the perception data gathered by the sensor suite 520 of the infrastructure object 150. For example, the perception analysis module 520 may be configured to process sensor data (obtained by the sensor suite 520 of the infrastructure object 150) indicative of an environment surrounding the infrastructure object 150 to determine whether the sensor data of the infrastructure object 150 can be useful to a certain AV 110 having a region of obstructed visibility. In another example, the perception analysis module 520 may be configured to compute a complexity score indicative of the environment surrounding the infrastructure object 150. The data shared by the perception analysis module 520 with one of more AVs 110 may be used by the AVs 110 to establish their driving strategy based on the information indicative of the environment surrounding the infrastructure object 150. In some embodiments, the perception analysis module 520 may include any suitable processing device (e.g., one or more processing devices), e.g., any of the processing devices described with reference to the perception analysis module 320 of the collaborative perception system 130 of the AV 110.

In some embodiments, the infrastructure object 150 may be substantially stationary object, such as a traffic light. However, in other embodiments, the infrastructure object 150 may be a mobile object, such as an aerial mobile sensing unit 710, shown in FIG. 7. In further embodiments, the infrastructure object 150 may be placed on mobile objects, such as bicycles, pedestrians, buses, trains, scooters, helicopters, boats, or any form of land, air, or water mobility devices, which could drastically improve sensor coverage of observable and unobservable scenes. In still other embodiments, the infrastructure object 150 may be placed on mobile robotic devices such as security robots, flying drones, delivery robots, etc., to allow for a more comprehensive and adjustable coverage through an area.

Example methods with steps that may be implemented by the infrastructure object 150 are described with reference to FIGS. 9-11.

Example Settings

Figure 7:
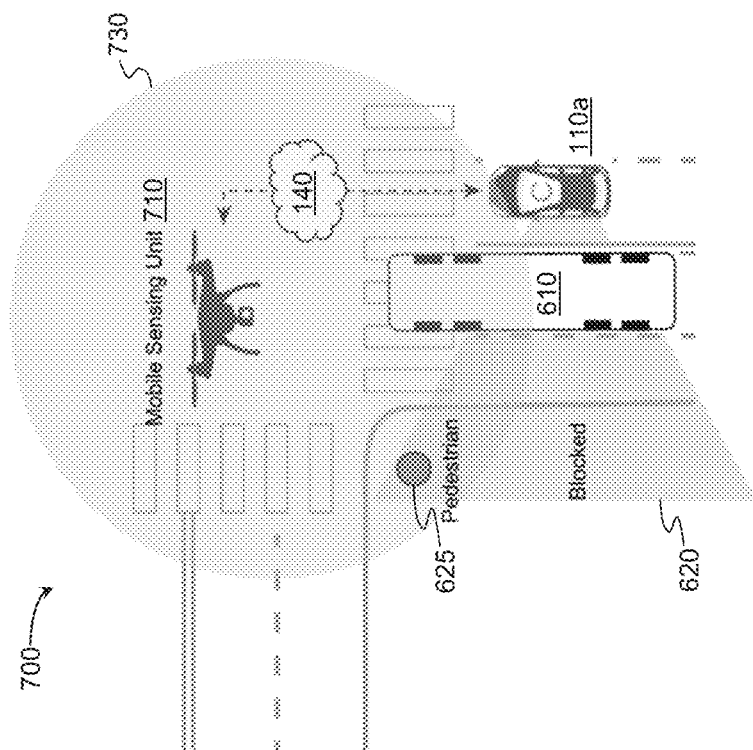
FIGS. 6-8 illustrate example settings in which at least some aspects of collaborative perception according to some embodiments of the present disclosure may be implemented.
Figure 6:
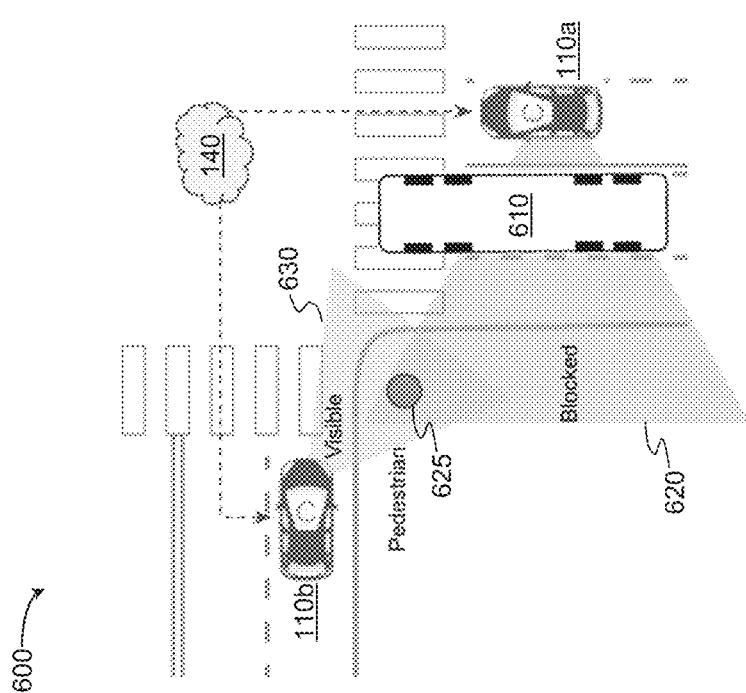
Figure 8:
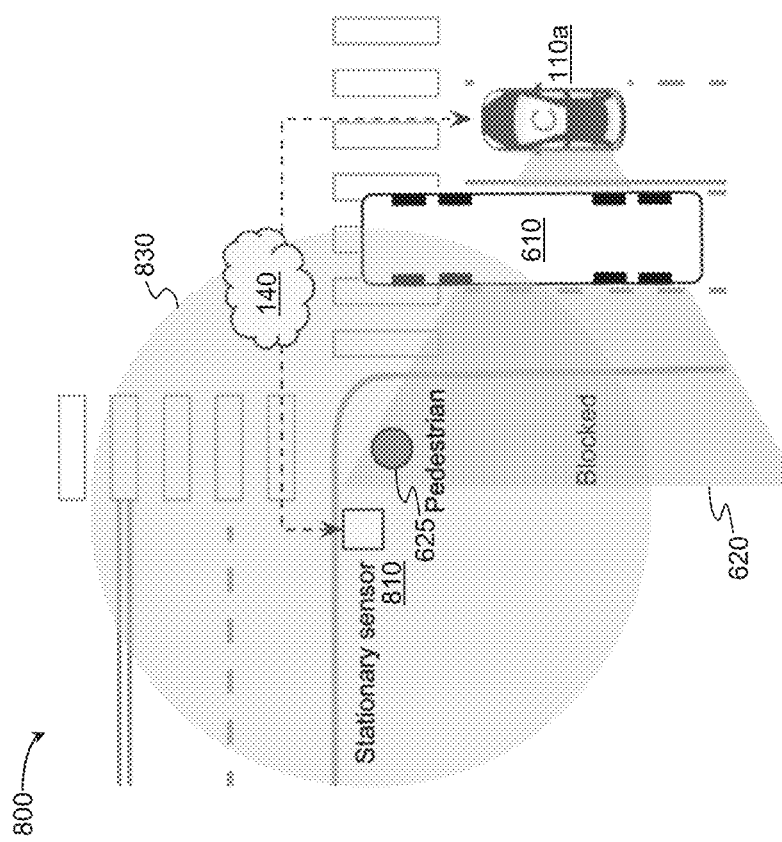

FIGS. 6-8 illustrate example settings in which at least some aspects of collaborative perception according to some embodiments of the present disclosure may be implemented.

FIG. 6 illustrates a first setting 600 in which the AV 110*a* that may benefit from collaborative perception may be operating. As shown in FIG. 6, another road object such as a bus 610 may block a certain field of view of the AV 110*a*, e.g., a region 620 may be a region of obstructed visibility for the AV 110*a*. The region 620 may include an object, such as a pedestrian 625, that the AV 110*a* is not able to detect because of the bus 610 being in the way. However, another AV 110 in the vicinity of the AV 110*a*, shown in FIG. 6 as the AV 110*b*, may have visibility into a region 630, which region 630 at least partially overlaps with the blocked region 620. In particular, as shown in FIG. 6, the visible region 630 may allow the AV 110*b* to detect the pedestrian 625. When the AV 110*a* communicates with the AV 110*b*, the perception data obtained by the AV 110*b* may enable the AV 110*a* to detect the presence of the pedestrian 625 and adapt its driving strategy accordingly. For example, the AV 110*a* may slow down or stop to yield to the pedestrian 625. As can be seen in FIG. 6, the AV 110*b* may also have a region of visibility obstructed by the bus 610 so that the AV 110*b* may not necessarily "see" the AV 110*a*. When the AV 110*a* communicates with the AV 110*b*, the perception data obtained by the AV 110*a* may enable the AV 110*b* to detect the presence of the AV 110*a* and adapt its driving strategy accordingly. For example, the AV 110*b* may slow down or stop to yield to the AV 110*a*. In some embodiments, the vehicle management system 140 may assist communication between the AV 110*a* and 110*b*, e.g., the vehicle management system 140 may identify AV 110*b* and 110*a*, and/or vice versa.

FIG. 7 illustrates a second setting 700 in which the AV 110*a* that may benefit from collaborative perception may be operating. FIG. 7 illustrates the bus 610, the blocked region 620, and the pedestrian 625 as described with reference to FIG. 6. FIG. 7 further illustrates that a mobile sensing unit 710 may be in the vicinity of the AV 110*a* and may have visibility into a region 730, which region 730 at least partially overlaps with the blocked region 620. In particular, as shown in FIG. 7, the visible region 730 may allow the mobile sensing unit 710 to detect the pedestrian 625. When the AV 110*a* communicates with the mobile sensing unit 710, e.g., assisted by the vehicle management system 140, the perception data obtained by the mobile sensing unit 710 may enable the AV 110*a* to detect the presence of the pedestrian 625 and adapt its driving strategy accordingly. In some embodiments, the mobile sensing unit 710 may be an example of the infrastructure object 150 described herein. In other embodiments, the mobile sensing unit 710 may be an example of one of the AVs 110 described herein.

FIG. 8 illustrates a third setting 800 in which the AV 110*a* that may benefit from collaborative perception may be operating. FIG. 8 illustrates the bus 610, the blocked region 620, and the pedestrian 625 as described with reference to FIG. 6. FIG. 8 further illustrates that a stationary sensor 810 may be in the vicinity of the AV 110*a* and may have visibility into a region 830, which region 830 at least partially overlaps with the blocked region 620. In particular, as shown in FIG. 8, the visible region 830 may allow the stationary sensor 810 to detect the pedestrian 625. When the AV 110*a* communicates with the stationary sensor 810, e.g., assisted by the vehicle management system 140, the perception data obtained by the stationary sensor 810 may enable the AV 110*a* to detect the presence of the pedestrian 625 and adapt its driving strategy accordingly. In some embodiments, the stationary sensor 810 may be an example of the infrastructure object 150 described herein.

Of course, embodiments of collaborative perception described herein may be implemented in settings other than the ones shown in FIGS. 6-8, all of which settings and embodiments being within the scope of the present disclosure.

Example Method for a First Scenario of Collaborative Perception

Figure 9:
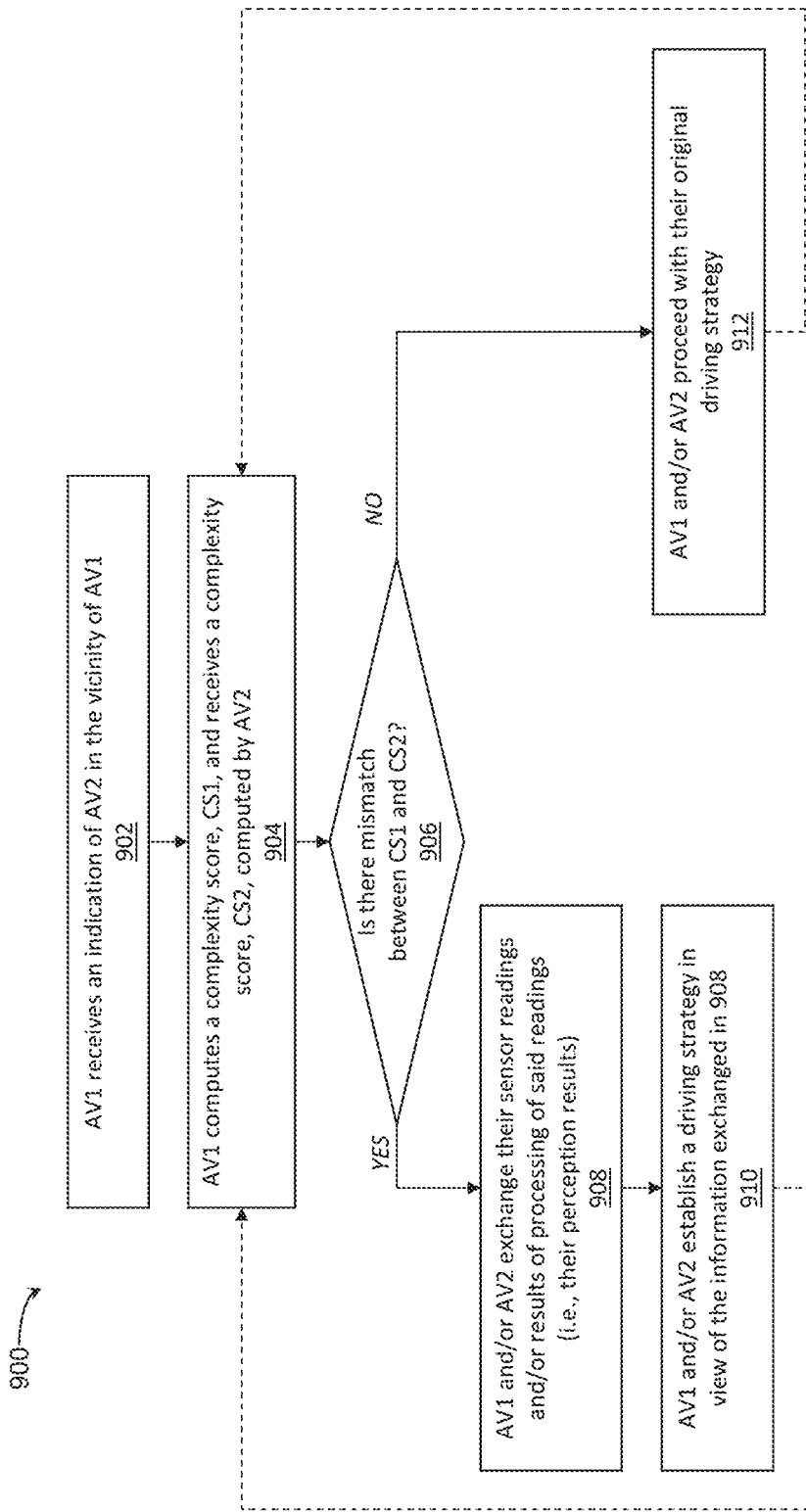
FIG. 9 is a flowchart of an example method for a first scenario of collaborative perception according to some embodiments of the present disclosure.

FIG. 9 is a flowchart of an example method 900 for a first scenario of collaborative perception according to some embodiments of the present disclosure, namely, the scenario of two AVs in the vicinity of one another exchanging complexity scores indicative of their respective environments. Although various steps of the method 900 are shown in a certain order and with respect to the system shown in FIG. 1 and the setting shown in FIG. 6, in various embodiments, these steps may be performed in a different order (or at least in at least partially overlapping times), and/or by a system different from the one shown in FIG. 1, and/or for the settings other than the one shown in FIG. 6.

The method 900 may begin with a step 902 that includes a first AV (referred to in the following as "AV1") receiving an indication of a second AV (referred to in the following as "AV2") in the vicinity of AV1. AV1 and AV2 may be different ones of the AVs 110. AV1 may receive the indication of AV2 via the communications module 310 of the collaborative perception system 130 of AV1. There are several ways in which the step 902 may be triggered. For example, in some embodiments, the vehicle management system 140 is aware of the locations of AV1 and AV2 (which locations may be tracked in the location database 430) and may, therefore, identify that AV2 is in the vicinity of AV1 (e.g., by the vehicle management system 140 determining the AV2 and AV1 satisfy a certain proximity threshold). The vehicle management system 140 may then identify AV2 to AV1 in the step 902 so that later on AV1 may obtain perception data from AV2, if needed. In other embodiments, AV1 may request the vehicle management system 140 (e.g., using the communications module 310 of AV1) to provide identifications of other AVs in the vicinity of AV1. For example, AV1 may do so at certain times, or periodically in certain time intervals. In another example, AV1 may request the vehicle management system 140 to provide identifications of other AVs in the vicinity of AV1 when the perception analysis module 320 of AV1 identifies, based on sensor data obtained by the sensor suite 120 of AV1, a blind spot of AV1, e.g., the blocked region 620, shown in FIG. 6. In some embodiments of the step 902, AV1 may provide to the vehicle management system 140 information identifying the location of the blind spot of AV1, which may be done in terms of GPS coordinates of the blind spot, identification of one or more sensors of the sensor suite 120 of AV1 which seem to encounter the blind spot, location of the blind spot relative to the position of AV1, or in any other manner, all of which being within the scope of the present disclosure. The vehicle management system 140 may then be configured to search for not only AVs in the vicinity of AV1, but AVs which may, specifically, have a view into the region of the blind spot of AV1. Thus, in some embodiments, AV2 identified to AV1 in the step 902 may be an AV that has a view of the blind spot of AV1. In some embodiments, the step 902 may also include AV2 receiving an indication of AV1.

The method 900 may then proceed with a step 904 that includes AV1 and AV2 exchanging information that may provide an indication as to whether exchange of the perception data between AV1 and AV2 is in order. In some embodiments of the step 904, AV1 may compute (e.g., using the perception analysis module 320 of AV1) a complexity score based on the sensor data gathered by the sensor suite 120 of AV1 and provide it (e.g., using the communications module 310 of AV1) to AV2. Similarly, the step 904 may include AV2 computing (e.g., using the perception analysis module 320 of AV2) a complexity score based on the sensor data gathered by the sensor suite 120 of AV2 and providing it (e.g., using the communications module 310 of AV2) to AV1. The complexity score computed based on the sensor data collected by AV1 may be designated as CS1 and the complexity score computed based on the sensor data collected by AV2 may be designated as CS2. Thus, CS1 is a value indicative of an environment surrounding AV1, while CS2 is a value indicative of an environment surrounding AV2. In some embodiments, each of CS1 and CS2 may be a value indicative of one or more of (and/or an aggregate of) a number of vulnerable road users (e.g., pedestrians, bicycles, motorcycles, scooters, etc.), a number of active vehicles (e.g., non-autonomous vehicles or other AVs), a number of static obstacles (e.g., infrastructure objects), an occupancy of a free-space grid (e.g., percentage of scene area occupied by road actors' bounding boxes footprints), a percentage of obstructed versus observable motion grid (e.g., the amount of the observable roadway that is occupied or invisible due to obstructions, etc.), a position of each of one or more vehicles (e.g., locations of the other vehicles), and a lane direction of each of one or more vehicles (e.g., a direction or an identification of a lane in which the other vehicles are moving). For example, with reference to the setting shown in FIG. 6, the complexity score computed based on the sensor data of the AV 110b may be indicative of the pedestrian 625 as a vulnerable road user, the bus 610 as an active vehicle (assuming that the AV 110b does not "see" the AV 110a), the position of the bus 610, and the lane direction of the bus 610.

Provided that AV1 and AV2 use the same algorithm for computing their complexity scores, these complexity scores may be meaningfully compared to one another to determine whether further exchange of information between AV1 and AV2 is in order. Therefore, the method 900 may then proceed with a step 906 that includes comparing CS1 and CS2 to determine whether there is a mismatch. In some embodiments, the step 906 may include the perception analysis module 320 of AV1 making this determination and sharing the outcome with AV2. In other embodiments, the step 906 may include the perception analysis module 320 of AV2 making this determination and sharing the outcome with AV1. In yet other embodiments, the step 906 may include the perception analysis module 320 of AV1 and the perception analysis module 320 of AV2 making this determination independently of one another. In general, the step 906 may include determining whether the difference between CS1 and CS2 satisfies one or more criteria for establishing that data exchange between AV1 and AV2 is in order. In some embodiments, the step 906 may include establishing that there is a mismatch when the difference between CS1 and CS2 is above a certain threshold.

Upon the positive determination in the step 906 (i.e., when it is determined that the difference between CS1 and CS2 satisfies one or more criteria for establishing that data exchange between AV1 and AV2 is in order), the method 900 may proceed with a step 908 that includes AV1 and AV2 exchanging their sensor readings and/or results of processing of said sensor readings (i.e., exchanging their respective perception data) to account for the mismatch between CS1 and CS2. For example, with reference to the setting 600 of FIG. 6, CS2 computed based on the sensor data of the AV 110b may indicate the presence of the pedestrian 625 while CS1 computed based on the sensor data of the AV 110a would not indicate the presence of the pedestrian 625 and, therefore, a mismatch would be established in the step 904. The AVs 110a and 110b would then exchange their sensor readings and/or results of processing of said sensor readings that would enable the AV 110a to establish the presence of the pedestrian 625. In some embodiments, for a given AV, the sensor readings of the step 906 may include data indicative of one or more of a field of view of the AV, a position of each of one or more objects surrounding the AV, a velocity of each of the one or more objects surrounding the AV, and one or more predictions regarding the environment surrounding the AV. In some embodiments, AV2 may provide to AV1 (and/or vice versa) sensor readings as generated by one or more sensors of the sensor suite 120 of AV2. In some embodiments, AV2 may provide to AV1 (and/or vice versa) not the sensor readings as generated by one or more sensors of the sensor suite 120 of AV2 but results of processing of such sensor readings. For example, AV2 may use the sensor readings to compute certain characteristics of the environment surrounding AV2, establish predictions regarding the environment surrounding AV2, etc., which results may then be shared with AV1. Exchanging of sensor data describing the environment surrounding the AVs in the step 908 may require time and processing resources. That is why first exchanging the complexity scores in the step 904 and using those to determine, in the step 906, whether the data exchange of the step 908 is in order may be particular advantageous.

In some embodiments, the step 908 may only include AV1 receiving sensor readings and/or results of processing of said sensor readings from AV2 (i.e., AV1 receiving sensor data describing the environment surrounding AV2). In some embodiments, the step 908 may only include AV2 receiving sensor readings and/or results of processing of said sensor readings from AV1 (i.e., AV2 receiving sensor data describing the environment surrounding AV1). In some embodiments, the step 908 may include both 1) AV1 receiving sensor readings and/or results of processing of said sensor readings from AV2 and 2) AV2 receiving sensor readings and/or results of processing of said sensor readings from AV1.

From the step 908, the method 900 may proceed with a step 910 that includes one or more of AV1 and AV2 establishing a driving strategy based on the data exchanged in the step 908. For example, with reference to the setting 600 of FIG. 6, in the step 910 AV 110a may decide to slow down or stop to yield to the pedestrian 625. In another example with reference to the setting 600 of FIG. 6, in the step 910 AV 110b may decide to slow down or stop to yield to the AV 110a, instead of attempting to proceed through the intersection. Thus, in some embodiments, the step 910 may include changing the original driving strategies of AV1 and/or AV2. Such changes in the driving strategy would result in safer behavior of AV1 and/or AV2.

Upon the negative determination in the step 906 (i.e., when it is determined that the difference between CS1 and CS2 does not satisfies one or more criteria for establishing that data exchange between AV1 and AV2 is in order), the method 900 may proceed with a step 912 that includes AV1 and/or AV2 proceeding with their original driving strategy. More generally, the step 912 may include AV1 and/or AV2 establishing their driving strategies based on the determination that the difference between CS1 and CS2 does not satisfies one or more criteria for establishing that data exchange between AV1 and AV2 is in order.

In some embodiments, from either one or both of the steps 910 and 912 the method 900 may proceed back to the step 904 and the step 904 (as illustrated in FIG. 9 with a dashed arrows from the steps 910 and 912 to the step 904) and the subsequent steps of the method 900 may be repeated. For example, the steps may be repeated again after a certain amount of time, e.g., after 10 seconds, to account for the changes in the environments of AV1 and/r AV2.

Example Method for a Second Scenario of Collaborative Perception

Figure 10:
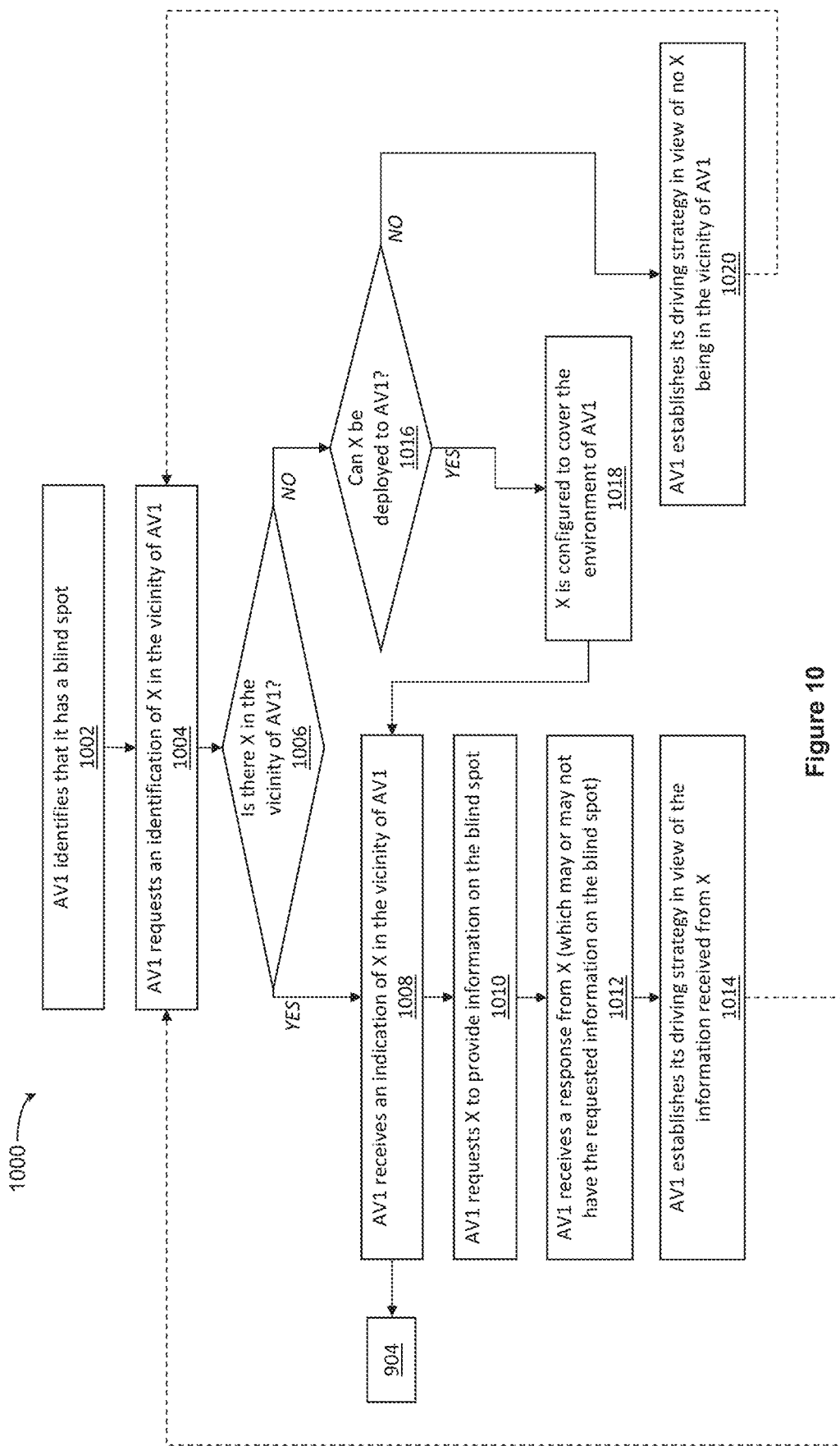
FIG. 10 is a flowchart of an example method for a second scenario of collaborative perception according to some embodiments of the present disclosure.

FIG. 10 is a flowchart of an example method 1000 for a second scenario of collaborative perception according to some embodiments of the present disclosure, namely, the scenario of an AV detecting that it has a blind spot and seeking other AVs or infrastructure objects to provide information indicative of the environment in the blind spot. Although various steps of the method 1000 are shown in a certain order and with respect to the system shown in FIG. 1 and the settings shown in FIGS. 6-8, in various embodiments, these steps may be performed in a different order (or at least in at least partially overlapping times), and/or by a system different from the one shown in FIG. 1, and/or for the settings other than the ones shown in FIGS. 6-8.

The method 1000 may begin with a step 1002 that includes a first AV (referred to in the following as "AV1") identifying that it has a blind spot. For example, the perception analysis module 320 of the collaborative perception system 130 of AV1 may use sensor readings from the sensor suite 120 of AV1 to identify a blind spot. With reference to the settings shown in any one of FIGS. 6-8, the AV 110a may identify the blocked region 620 as its blind spot.

The method 1000 may then proceed with a step 1004 that includes AV1 requesting an identification of another AV or an infrastructure sensor (referred to in the following as "X" and described as a "perception unit") in the vicinity of AV1. For example, AV1 may provide such a request to the vehicle management system 140 that has an overview of all AVs 110 in the fleet as well as infrastructure sensors 150 (e.g., stored in the location database 430). The communications module 310 of the collaborative perception system 130 of AV1 may provide the request of the step 1004. In some embodiments of the step 1004, AV1 may provide to the vehicle management system 140 information identifying the location of the blind spot of AV1, which may be done in terms of GPS coordinates of the blind spot, identification of one or more sensors of the sensor suite 120 of AV1 which seem to encounter the blind spot, location of the blind spot relative to the position of AV1, or in any other manner, all of which being within the scope of the present disclosure. In some embodiments of the step 1004, AV1 may provide to the vehicle management system 140 information indicative of a proportion of the region of obstructed visibility of AV1 compared to a region of unobstructed visibility of AV1. The vehicle management system 140 may then be configured to search for not only AVs in the vicinity of AV1, but AVs which may, specifically, have a view into the region of the blind spot of AV1. Thus, in some embodiments, X identified to AV1 in response to the request of the step 1004 may be an X that has a view of the blind spot of AV1.

The method 1000 may then include with a step 1006 that includes the vehicle management system 140 determining whether there is a perception unit X in the vicinity of AV1, capable of obtaining information indicative of an environment surrounding AV1. If the request provided in the step 1004 included an identification of the blind spot, then in the step 1006 the vehicle management system 140 may determine if there is X in the vicinity of AV1 and with at least a partial view onto the blind spot of AV1.

Although not specifically shown in FIG. 10, in some embodiments, after the vehicle management system 140 received the request of the step 1004, the vehicle management system 140 may first determine whether the information provided in the request satisfies one or more criteria for the vehicle management system 140 to start searching for a perception unit X, in the step 1006. For example, the request of the step 1004 may include a percentage of the region of the blind spot in the view of AV1 (e.g., with respect to the total field of view of AV1) and/or a location of the blind spot of AV1 and the vehicle management system 140 may first determine whether this percentage and/or location of the blind spot are significant enough to start searching for the perception unit X in the step 1006.

Upon positive determination in the step 1006, the method 1000 may proceed with a step 1008 that includes AV1 receiving an indication of X in the vicinity of AV1. For example, with reference to the setting 600 shown in FIG. 6, in the step 1008, AV1 (which could be the AV 110a shown in FIG. 6) may receive an indication of the AV 110b (i.e., in this case X is the AV 110b) that is in the vicinity of the AV 110a and has the region of visibility 630 that partially overlaps with the blocked region 620. In another example, with reference to the setting 700 shown in FIG. 7, in the step 1008, AV1 (which could be the AV 110a shown in FIG. 7) may receive an indication of the mobile sensing unit 710 (i.e., in this case X is the mobile sensing unit 710) that is in the vicinity of the AV 110a and has the region of visibility 730 that partially overlaps with the blocked region 620. In yet another example, with reference to the setting 800 shown in FIG. 8, in the step 1008, AV1 (which could be the AV 110a shown in FIG. 8) may receive an indication of the stationary sensor 810 (i.e., in this case X is the stationary sensor 810) that is in the vicinity of the AV 110a and has the region of visibility 830 that partially overlaps with the blocked region 620. In various embodiments, AV1 may receive the indication of X in the step 1008 using the communications module 310 of the collaborative perception system 130 of AV1.

As shown in FIG. 10, the method 1000 may proceed from the step 1008 in any one of two options. In a first option, when X identified to AV1 in the step 1008 is another AV (e.g., the AV 110b shown in FIG. 6), the method 1000 may proceed from the step 1008 to the step 904 and then proceed with the rest of the method 900 shown in FIG. 9. In a second option, the method 1000 may proceed from the step 1008 to a step 1010 that includes AV1 providing a request to the X identified in the step 1008 to provide to AV1 information indicative of an environment surrounding AV1. For example, in some embodiments the request of the step 1010 may include a request to provide information describing the blind spot of AV1. In some embodiments of the step 1010, AV1 may provide to the perception unit X information identifying the location of the blind spot of AV1, which may be done in terms of GPS coordinates of the blind spot, identification of one or more sensors of the sensor suite 120 of AV1 which seem to encounter the blind spot, location of the blind spot relative to the position of AV1, or in any other manner, all of which being within the scope of the present disclosure. In various embodiments, AV1 may provide the request to X in the step 1010 using the communications module 310 of the collaborative perception system 130 of AV1.

The method 1000 may then proceed with a step 1012 that includes AV1 receiving from X a response to the request of the step 1010, which response may or may not have the information on the blind spot of AV1. For example, in some embodiments, the step 1012 may include AV1 receiving sensor readings of the perception unit X and/or results of processing of said sensor readings of the perception unit X, e.g., as was described with reference to AV1 receiving such information in the step 908 of the method 900.

From the step 1012, the method 1000 may proceed with a step 1014 that includes AV1 establishing a driving strategy based on the data received in the step 1012. For example, with reference to the setting 600 of FIG. 6, in the step 1014 AV 110a may decide to slow down or stop to yield to the pedestrian 625. Thus, in some embodiments, the step 1014 may include changing the original driving strategy of AV1, resulting in safer behavior of AV1. In case the response of the step 1012 did not provide the information on the blind spot of AV1, AV1 may still establish a driving strategy in 1014 based on the knowledge that X did not provide such information. For example, AV1 may decide to slow down or stop to be on the safe side, or to wait until the information on the blind spot is received from another perception unit. As shown in FIG. 10 with a dashed arrow from the step 1014 to the step 1004, in some embodiments, the method 1000 may proceed from the step 1014 back to the step 1004 where AV1 may request an identification of another X in the vicinity of AV1.

Turning back to the step 1006, upon negative determination in the step 1006 (e.g., when it is determined that there is no perception unit X in the vicinity of AV1 and/or when it is determined that there is no perception unit X that is capable of providing information indicative of the environment surrounding AV1), the method 1000 may proceed with a step 1016 that includes the vehicle management system 140 determining whether a further perception unit X capable of obtaining information indicative of the environment surrounding AV1 can be deployed.

Upon positive determination in the step 1016, the method 1000 may proceed with a step 1018 that includes the vehicle management system 140 configuring such a further perception unit X to be capable of obtaining information indicative of the environment surrounding AV1. For example, with reference to the setting 600 of FIG. 6, in the step 1014 the vehicle management system 140 may deploy the AV 110b to position itself in the vicinity of the AV 110a so that the visibility region 630 of the AV 110b at least partially overlaps with the blocked region 620 of the AV 110a. In another example, with reference to the setting 700 of FIG. 7, in the step 1014 the vehicle management system 140 may deploy the mobile sensing unit 710 to position itself in the vicinity of the AV 110a so that the visibility region 730 of the mobile sensing unit 710 at least partially overlaps with the blocked region 620 of the AV 110a. In yet another example, with reference to the setting 800 of FIG. 8, in the step 1014 the vehicle management system 140 may change the orientation of one or more sensors of the sensor suite 120 of the stationary sensor 810 so that the visibility region 830 of the stationary sensor 810 at least partially overlaps with the blocked region 620 of the AV 110a. The vehicle management system 140 may then provide the identification of the further perception unit X configured in the step 1018 and the method 1000 may proceed from the step 1018 to the step 1008, described above.

Upon negative determination in the step 1016, the method 1000 may proceed with a step 1020 that includes AV1 establishing a driving strategy based on the fact that no perception unit X in the vicinity of AV1 that is capable of obtaining information indicative of the environment of AV1 was found. For example, AV1 may decide to slow down or stop to be on the safe side, or to wait until the information on the blind spot is received from another perception unit. As shown in FIG. 10 with a dashed arrow from the step 1020 to the step 1004, in some embodiments, the method 1000 may proceed from the step 1020 back to the step 1004 where AV1 may again request an identification of a perception unit X in the vicinity of AV1.

Example Method for a Third Scenario of Collaborative Perception

Figure 11:
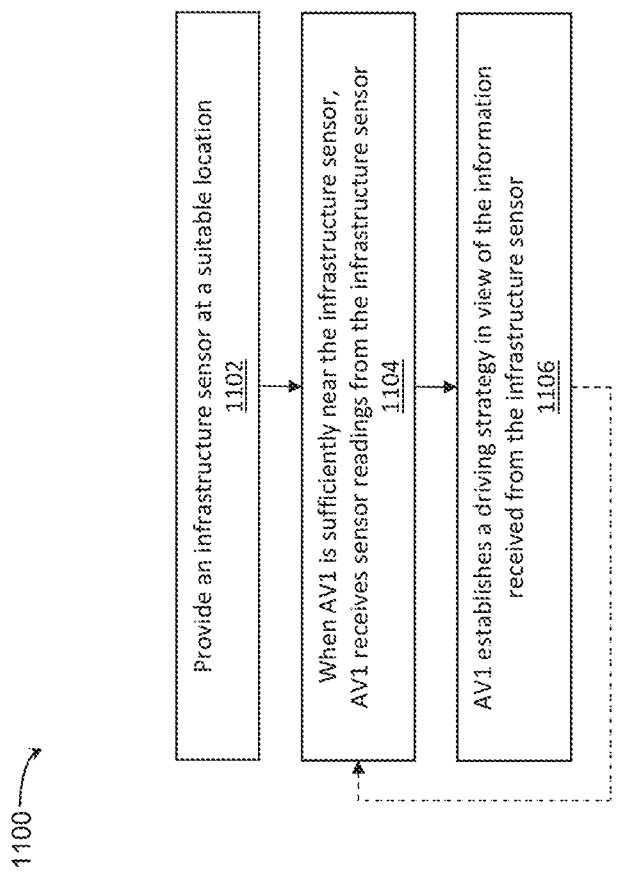
FIG. 11 is a flowchart of an example method for a third scenario of collaborative perception according to some embodiments of the present disclosure.

FIG. 11 is a flowchart of an example method 1100 for a third scenario of collaborative perception according to some embodiments of the present disclosure, namely, the scenario of providing infrastructure objects equipped with sensors in appropriate locations so that, when an AV is in the vicinity of such objects, the AV may receive information from their sensors. Although various steps of the method 1100 are shown in a certain order and with respect to the system shown in FIG. 1 and the setting shown in FIG. 8, in various embodiments, these steps may be performed in a different order (or at least in at least partially overlapping times), and/or by a system different from the one shown in FIG. 1, and/or for the settings other than the one shown in FIG. 8.

The method 1100 may begin with a step 1102 that includes providing an infrastructure sensor, e.g., the infrastructure sensor 150, at a suitable location. A location may be described as "suitable" if it is expected that AVs 110 may have limited visibility on certain regions surrounding this location and may, therefore, be expected to benefit from collaborative perception enabled by the infrastructure sensor 150 placed in that location. For example, the infrastructure sensor 150 may be placed at the end of a driveway, or around a sharp road turn, in a vehicle facility, etc. In other examples, the infrastructure sensor 150 may be placed in any area of high traffic and/or low observability in an urban environment (e.g., the infrastructure sensor 150 may be placed at a corner of an intersection, as shown in FIG. 8 with a stationary sensor 810).

The method 1100 may then proceed with a step 1104 that includes AV1 receiving sensor readings of the infrastructure sensor 150 and/or results of processing of said sensor readings when AV1 is sufficiently near the infrastructure sensor 150. For example, in some embodiments, the step 1104 may include AV1 receiving sensor readings of the infrastructure sensor 150, e.g., as was described with reference to AV1 receiving such information from another AV in the step 908 of the method 900.

From the step 1104, the method 1100 may proceed with a step 1106 that includes AV1 establishing a driving strategy based on the data received in the step 1104.

Summary of the Scenarios of Collaborative Perception

As the foregoing illustrates, by fusing perception data from multiple AVs 110 and/or infrastructure sensors 150, the AVs 110 can make better driving decisions by having more information on a scene. This way, the AVs 110 can patch gaps in their sensing and perception, being able to "see" road actors that they may not see otherwise. For example, an occlusion in a field of view of a given AV 110 caused by a bus may be remedied by communicating with other AVs 110 and/or infrastructure sensors 150.

In some embodiments of the methods shown in FIGS. 9-11, it may not only be useful to share perception data indicative of sensor readings but also planning decisions between different AVs 110 can be coordinated. For example, with reference to the setting 600 shown in FIG. 6, two vehicles such as AV 110a and AV 110b may arrive at a stoplight of the intersection substantially simultaneously. In a normal traffic situation, both would have to determine which vehicle arrived first and should, therefore, proceed first. Not all drivers reach the same determination in some situation and confusion can ensue. However, with the collective planning enabled by the exchange of information as described with reference to the method 900 of FIG. 9, AV 110a and AV 110b can communicate quickly and assign their order of crossing the intersection faster than human drivers might. In another example of the advantages of collective planning is the ability of interconnected AVs 110 to drive closer to one another when driving a long a straight road and react faster, as a single unit, to the environment around them. Human drivers keep a distance from one another that allows them to perceive intent from the lead car and react to it. However, if both the lead and follow cars are AVs 110, the lead car can transmit that intent to the follow car and this would allow both AVs to cut out some of the delay time in, e.g., accelerating to speed when a traffic light turns green.

Example Data Processing System

Figure 12:
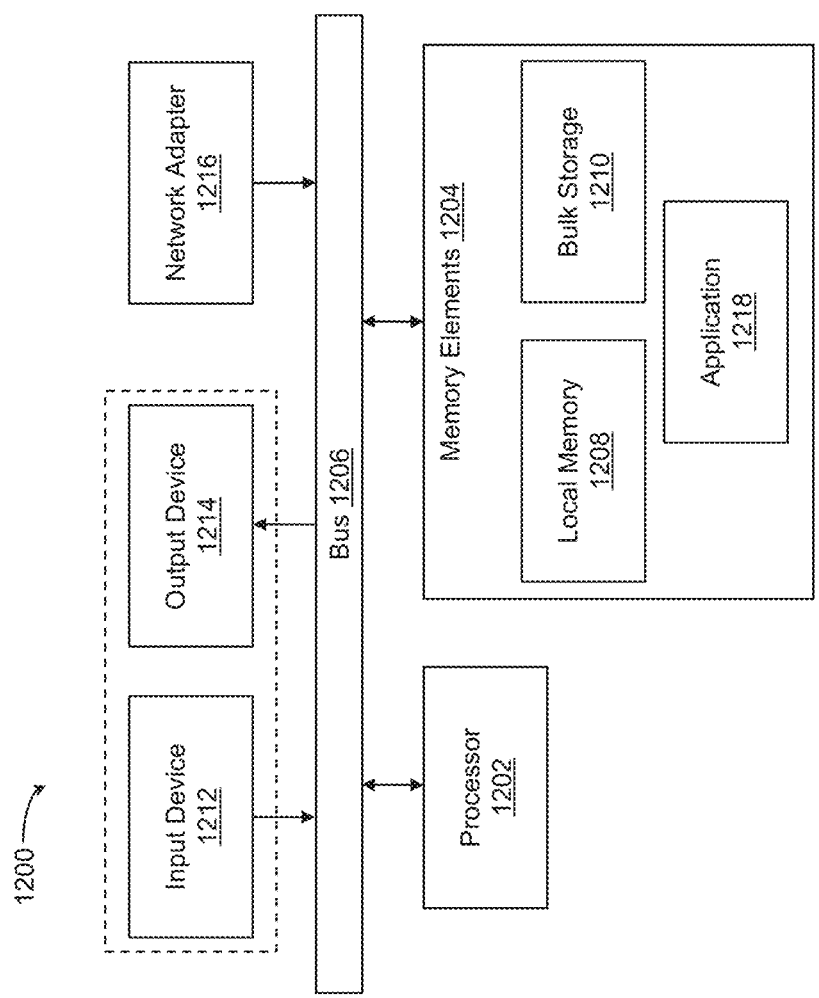
FIG. 12 is a block diagram illustrating a data processing system that may be used to implement various aspects of collaborative perception according to some embodiments of the present disclosure.

FIG. 12 provides a block diagram illustrating an example data processing system 1200 that may be configured to implement, or control implementations of, at least portions of collaborative perception as described herein. For example, in some embodiments, the data processing system 1200 may implement at least portions of any components of the collaborative perception system 130. In some embodiments, the data processing system 1200 may implement at least portions of any components of the sensor suite 120, the vehicle management system 140, or the infrastructure object 150.

As shown in FIG. 12, the data processing system 1200 may include at least one processor 1202, e.g. a hardware processor 1202, coupled to memory elements 1204 through a system bus 1206. As such, the data processing system may store program code within memory elements 1204. Further, the processor 1202 may execute the program code accessed from the memory elements 1204 via a system bus 1206. In one aspect, the data processing system may be implemented as a computer that is suitable for storing and/or executing program code. It should be appreciated, however, that the data processing system 1200 may be implemented in the form of any system including a processor and a memory that is capable of performing the functions related to collaborative perception, described within this disclosure.

In some embodiments, the processor 1202 can execute software or an algorithm to perform the activities described herein, in particular activities related to implementing collaborative perception as described herein. The processor 1202 may include any combination of hardware, software, or firmware providing programmable logic, including by way of non-limiting example a microprocessor, a DSP, a field-programmable gate array (FPGA), a programmable logic array (PLA), an application-specific integrated circuit (IC) (ASIC), or a virtual machine processor. The processor 1202 may be communicatively coupled to the memory element 1204, for example in a direct-memory access (DMA) configuration, so that the processor 1202 may read from or write to the memory elements 1204.

In general, the memory elements 1204 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 1200 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any of the circuits/components shown in FIGS. 1-5, can also include suitable interfaces for receiving, transmitting, and/or otherwise communicating data or information in a network environment so that they can communicate with, e.g., the data processing system 1200 of another one of these elements.

In certain example implementations, mechanisms for collaborative perception as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 1204 shown in FIG. 12, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 1202 shown in FIG. 12, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 1204 may include one or more physical memory devices such as, for example, local memory 1208 and one or more bulk storage devices 1210. The local memory may refer to RAM or other non-persistent memory device(s) generally used during actual execution of the program code. A bulk storage device may be implemented as a hard drive or other persistent data storage device. The processing system 1200 may also include one or more cache memories (not shown) that provide temporary storage of at least some program code in order to reduce the number of times program code must be retrieved from the bulk storage device 1210 during execution.

As shown in FIG. 12, the memory elements 1204 may store an application 1218. In various embodiments, the application 1218 may be stored in the local memory 1208, the one or more bulk storage devices 1210, or apart from the local memory and the bulk storage devices. It should be appreciated that the data processing system 1200 may further execute an operating system (not shown in FIG. 12) that can facilitate execution of the application 1218. The application 1218, being implemented in the form of executable program code, can be executed by the data processing system 1200, e.g., by the processor 1202. Responsive to executing the application, the data processing system 1200 may be configured to perform one or more operations or method steps described herein.

I/O devices depicted as an input device 1212 and an output device 1214, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 1214 may be any type of screen display, such as plasma display, liquid crystal display (LCD), organic light emitting diode (OLED) display, electroluminescent (EL) display, or any other indicator, such as a dial, barometer, or light-emitting diodes (LEDs). In some implementations, the system may include a driver (not shown) for the output device 1214. Input and/or output devices 1212, 1214 may be coupled to the data processing system either directly or through intervening I/O controllers.

In an embodiment, the input and the output devices may be implemented as a combined input/output device (illustrated in FIG. 12 with a dashed line surrounding the input device 1212 and the output device 1214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1216 may also, optionally, be coupled to the bus 1206 to enable the data processing system to become coupled to other systems, computer systems, remote network devices, and/or remote storage devices through intervening private or public networks. The network adapter may comprise a data receiver for receiving data that is transmitted by said systems, devices and/or networks to the data processing system 1200, and a data transmitter for transmitting data from the data processing system 1200 to said systems, devices and/or networks. Modems, cable modems, and Ethernet cards are examples of different types of network adapter that may be used with the data processing system 1200.

SELECT EXAMPLES

The following paragraphs provide some examples of various embodiments disclosed herein.

Example 1 provides a collaborative perception system for a first vehicle. The system includes a communications module and a perception analysis module. The communications module is configured to receive an indication of a second vehicle in a vicinity of the first vehicle, provide to the second vehicle a first complexity score (CS), the first CS indicative of an environment surrounding the first vehicle, and receive from the first vehicle a second CS, the second CS indicative of an environment surrounding the second vehicle. The perception analysis module is configured to determine whether a difference between the first CS and the second CS satisfies one or more criteria for establishing that data exchange is in order. Upon positive determination (i.e., when the perception analysis module determined that the difference between the first CS and the second CS satisfies one or more criteria for establishing that data exchange is in order), the perception analysis module is configured to cause the second vehicle to provide to the first vehicle sensor data describing the environment surrounding the second vehicle, and establish a driving strategy of the first vehicle based on the sensor data provided by the second vehicle.

Example 2 provides the collaborative perception system according to example 1, where, when determined that the difference between the first CS and the second CS satisfies the one or more criteria for establishing that data exchange is in order, the perception analysis module is further configured to cause the first vehicle (e.g., to cause the communications module of the first vehicle) to provide to the second vehicle sensor data describing an environment surrounding the first vehicle.

Example 3 provides the collaborative perception system according to examples 1 or 2, where, when determined that the difference between the first CS and the second CS does not satisfy the one or more criteria for establishing that data exchange is in order, the perception analysis module is configured to establish the driving strategy of the first vehicle based on the determination that the difference between the first CS and the second CS does not satisfy the one or more criteria for establishing that data exchange is in order.

Example 4 provides the collaborative perception system according to example 3, where establishing the driving strategy of the first vehicle based on the determination that the difference between the first CS and the second CS does not satisfy the one or more criteria for establishing that data exchange is in order includes proceeding with an original driving strategy of the first vehicle.

Example 5 provides the collaborative perception system according to any one of the preceding examples, where establishing the driving strategy of the first vehicle based on the sensor data provided by the second vehicle includes changing an original driving strategy of the first vehicle.

Example 6 provides the collaborative perception system according to any one of the preceding examples, where each of the first CS and the second CS is indicative of one or more of (and/or an aggregate of): a number of vulnerable road users, a number of active vehicles, a number of static obstacles, an occupancy of a free-space grid, a percentage of obstructed motion grid, a position of each of one or more vehicles, and a lane direction of each of one or more vehicles.

Example 7 provides the collaborative perception system according to any one of the preceding examples, where the communications module is further configured to request a vehicle management system to provide to the first vehicle the indication of the second vehicle in the vicinity of the first vehicle.

Example 8 provides the collaborative perception system according to example 7, where the perception analysis module is further configured to identify, based on sensor data describing an environment surrounding the first vehicle, a blind spot of the first vehicle, and the communications module is further configured to request the vehicle management system to provide to the first vehicle the indication of the second vehicle in the vicinity of the first vehicle such that the second vehicle has a view of the blind spot of the first vehicle.

Example 9 provides the collaborative perception system according to any one of the preceding examples, where the sensor data describing the environment surrounding the second vehicle includes data indicative of one or more of: a field of view of the second vehicle, a position of each of one or more objects surrounding the second vehicle, a velocity of each of the one or more objects surrounding the second vehicle, and one or more predictions regarding the environment surrounding the second vehicle.

Example 10 provides a vehicle management system that includes a vehicle manager module. The vehicle manager module is configured to receive, from a vehicle, an indication that the vehicle identified a region of obstructed visibility, determine whether a perception unit (e.g., a further vehicle, a mobile device, or a stationary object) capable of obtaining information indicative of an environment surrounding the vehicle is present in a vicinity of the vehicle. Upon positive determination, the vehicle manager module is configured to provide to the vehicle an identification of the perception unit. Upon negative determination, the vehicle manager module is configured to set up a further perception unit to obtain the information indicative of the environment surrounding the vehicle, and provide to the vehicle an identification of the further perception unit.

Example 11 provides the vehicle management system according to example 10, where the further perception unit is a mobile unit and where configuring the further perception unit to obtain the information indicative of the environment surrounding the vehicle includes configuring the mobile unit to relocate to the vicinity of the vehicle, obtain sensor data indicative of the environment surrounding the vehicle, and provide to the vehicle the sensor data.

Example 12 provides the vehicle management system according to example 11, where the sensor data includes data indicative of one or more of: a field of view of the mobile unit, a position of each of one or more objects surrounding the mobile unit, a velocity of each of the one or more objects surrounding the mobile unit, and one or more predictions regarding the environment surrounding the mobile unit.

Example 13 provides the vehicle management system according to examples 11 or 12, where the mobile unit is a further vehicle (e.g., an automobile or an aerial unit).

Example 14 provides the vehicle management system according to example 10, where the further perception unit is an infrastructure unit in the vicinity of the vehicle and where configuring the further perception unit to obtain the information indicative of the environment surrounding the vehicle includes configuring one or more sensors of the infrastructure unit to obtain sensor data indicative of the environment surrounding the vehicle, and configuring the infrastructure unit to provide the sensor data to the vehicle.

Example 15 provides the vehicle management system according to example 14, where configuring the one or more sensors includes changing an orientation of a field of view of the one or more sensors.

Example 16 provides the vehicle management system according to any one of the preceding examples, where the information indicative of the environment surrounding the vehicle includes information indicative of an environment in at least a portion of the region of obstructed visibility of the vehicle.

Example 17 provides the vehicle management system according to any one of the preceding examples, where the indication that the vehicle identified the region of obstructed visibility includes information indicative of one or more of: a proportion of the region of obstructed visibility compared to a region of unobstructed visibility of the vehicle, and a location of the region of obstructed visibility, the vehicle manager module is configured to determine whether the information included in the indication satisfies one or more criteria for determining whether the perception unit capable of obtaining the information indicative of the environment surrounding the vehicle is present in the vicinity of the vehicle, and the vehicle manager module is configured to determine whether the perception unit capable of obtaining the information indicative of the environment surrounding the vehicle is present in the vicinity of the vehicle when the vehicle manager module determines that the information included in the indication satisfies the one or more criteria.

Example 18 provides a collaborative perception system for a vehicle. The collaborative perception system includes a perception analysis module and a communications module. The perception analysis module is configured to process sensor data indicative of an environment surrounding the vehicle to identify a region of obstructed visibility of the vehicle. The communications module is configured to request a vehicle management system to provide an identification of a perception unit (e.g., a further vehicle, a mobile device, or a stationary object) in a vicinity of the vehicle, request the perception unit to provide information indicative of an environment surrounding the perception unit, and receive from the perception unit the information indicative of the environment surrounding the perception unit. The perception analysis module is further configured to establish a driving strategy of the vehicle based on the information indicative of the environment surrounding the perception unit.

Example 19 provides the collaborative perception system according to example 18, where the perception analysis module is further configured to determine whether the information indicative of the environment surrounding the perception unit includes information indicative of an environment in the region of obstructed visibility of the vehicle.

Example 20 provides the collaborative perception system according to example 19, where, when the perception analysis module determines that the information indicative of the environment surrounding the perception unit does not include information indicative of the environment in the region of obstructed visibility of the vehicle, the communications module is further configured to request the vehicle management system to provide an identification of a further perception unit (e.g., a further vehicle, a mobile device, or a stationary object) in the vicinity of the vehicle, request the further perception unit to provide information indicative of an environment surrounding the further perception unit, and receive from the further perception unit the information indicative of the environment surrounding the further perception unit. The perception analysis module is then configured to establish the driving strategy of the vehicle further based on the information indicative of the environment surrounding the further perception unit.

Example 21 provides a collaborative perception system for a vehicle. The system includes a communications module and a communications module. The communications module is configured to receive, from an infrastructure unit, information indicative of an environment surrounding the infrastructure unit. The perception analysis module is configured to establish a driving strategy of the vehicle based on the information received from the infrastructure unit.

Example 22 provides the collaborative perception system according to example 21, where the information received from the infrastructure unit includes one or more of: a field of view of the infrastructure unit, a position of each of one or more objects surrounding the infrastructure unit, a velocity of each of the one or more objects surrounding the infrastructure unit, and one or more predictions regarding the environment surrounding the infrastructure unit.

Example 23 provides the collaborative perception system according to examples 21 or 22, where the communications module is configured to receive the information from the infrastructure unit when the vehicle is in a vicinity of the infrastructure unit.

Example 24 provides a vehicle, including a collaborative perception system according to any one of the preceding examples (e.g., a collaborative perception system according to any one of examples 1-9 or 18-23). In a further example according to example 24, the vehicle is an AV. In various further examples according to example 24, the vehicle is an automobile, a boat, an unmanned aerial vehicle, a driverless car, etc.

Example 25 provides a method, including steps performed by a system according to any one of the preceding examples (e.g., performed by a collaborative perception system according to any one of examples 1-9 or 18-23, or performed by a vehicle management system according to any one of examples 10-17).

Example 26 provides a method, including steps that cause a system to operate according to any one of the preceding examples (e.g., a collaborative perception system according to any one of examples 1-9 or 18-23, or a vehicle management system according to any one of examples 10-17).

Example 27 provides a non-transitory computer-readable storage medium storing instructions which, when executed by a processor, cause the processor to perform at least portions of the method according to examples 25 or 26.

Example 28 provides a computer program product including instructions which, when executed by a processor, cause the processor to perform at least portions of the method according to examples 25 or 26.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It is also imperative to note that all of the specifications, dimensions, and relationships outlined herein (e.g., the number of modules/systems, logic operations, etc.) have only been offered for purposes of example and teaching only. Such information may be varied considerably without departing from the spirit of the present disclosure, or the scope of the appended claims. The specifications apply only to some non-limiting examples and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the drawings may be combined in various possible configurations, all of which are clearly within the broad scope of the present disclosure.

Note that in the present description, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the present disclosure, to limit this disclosure in any way that is not otherwise reflected in the appended claims.

The invention claimed is:

1. A collaborative perception system for a first vehicle, the collaborative perception system comprising:
   at least one processor, and at least one memory; and
   instructions encoded on the at least one memory that, when executed, instruct the at least one processor to:
      receive an indication of a second vehicle determined to be in a vicinity of the first vehicle and determined to have a view of a blind spot of the first vehicle caused by obstruction,
      compute a first complexity score (CS) based on sensor data collected by the first vehicle, the first CS indicative of an environment surrounding the first vehicle,
      receive from the second vehicle a second CS computed from sensor data collected by the second vehicle, the second CS indicative of an environment surrounding the second vehicle;
      wherein each of the first CS and the second CS includes, for the first vehicle and the second vehicle respectively: a number of vulnerable road users, a number of active vehicles, a number of static obstacles, an occupancy of a free-space grid, a percentage of obstructed motion grid, a position of each of one or more vehicles, and a lane direction of each of one or more vehicles;
      determine whether a mismatch between the first CS and the second CS exceeds a threshold; and
      upon determining that the mismatch exceeds the threshold:
         cause the second vehicle to provide, to the first vehicle, sensor data describing the environment surrounding the second vehicle to account for the mismatch, and
         determine and execute a driving maneuver based on the sensor data provided by the second vehicle.

2. The collaborative perception system according to claim 1, wherein, when determined that the mismatch between the first CS and the second CS exceeds a threshold, the processor executing the instructions is further to provide, by the first vehicle, to the second vehicle, sensor data describing an environment surrounding the first vehicle.

3. The collaborative perception system according to claim 1, wherein, when determined that the mismatch between the first CS and the second CS does not exceed the threshold, the processor executing the instructions is further to maintain a driving strategy of the first vehicle.

4. The collaborative perception system according to claim 1, wherein the processor executing the instructions is further to request a vehicle management system, to provide to the first vehicle, the indication that the second vehicle is in the vicinity of the first vehicle, and that the second vehicle has the view of the blind spot of the first vehicle.

5. The collaborative perception system according to claim 1, wherein the processor executing the instructions is further to:
   identify, based on sensor data describing the environment surrounding the first vehicle, the blind spot of the first vehicle, and
   request a vehicle management system, to provide to the first vehicle, the indication that the second vehicle is in the vicinity of the first vehicle, and that the second vehicle has a view of the identified blind spot of the first vehicle.

6. The collaborative perception system according to claim 1, wherein the sensor data describing the environment surrounding the second vehicle includes data indicative of one or more of:
   a field of view of the second vehicle,
   a position of each of one or more objects surrounding the second vehicle,
   a velocity of each of the one or more objects surrounding the second vehicle, and
   one or more predictions regarding the environment surrounding the second vehicle.

7. The collaborative perception system according to claim 1, wherein the occupancy of the free-space grid comprises percentage of scene area occupied by road actors' bounding boxes footprints.

8. The collaborative perception system according to claim 1, wherein the percentage of obstructed motion grid comprises an amount of observable roadway that is occupied or invisible due to obstructions.

9. The collaborative perception system according to claim 1, wherein:
   the position of each of one or more vehicles comprises locations of the vehicles, and
   the lane direction of each of one or more vehicles comprises a direction or an identification of a lane in which the vehicles are traveling.

10. A method comprising:
    receiving, by a first vehicle, an indication of a second vehicle determined to be in a vicinity of the first vehicle and determined to have a view of a blind spot of the first vehicle caused by obstruction,
    computing a first complexity score (CS) based on sensor data collected by the first vehicle, the first CS indicative of an environment surrounding the first vehicle,
    receiving from the second vehicle a second CS computed from sensor data collected by the second vehicle, the second CS indicative of an environment surrounding the second vehicle;
    wherein each of the first CS and the second CS includes, for the first vehicle and the second vehicle respectively: a number of vulnerable road users, a number of active vehicles, a number of static obstacles, an occupancy of a free-space grid, a percentage of obstructed motion grid, a position of each of one or more vehicles, and a lane direction of each of one or more vehicles;
    determining whether a mismatch between the first CS and the second CS exceeds a threshold; and
    upon determining the mismatch exceeds the threshold:
        causing the second vehicle to provide, to the first vehicle, sensor data describing the environment surrounding the second vehicle to account for the mismatch; and
        determining and executing a driving maneuver based on the sensor data provided by the second vehicle.

11. The method of claim 10, wherein the first vehicle and the second vehicle use a same algorithm for computing the first CS and the second CS respectively.

12. The method of claim 10, wherein determining whether the mismatch between the first CS and the second CS exceeds the threshold comprises comparing the first CS and the second CS.

13. The method of claim 10, further comprising sharing an outcome of the determining step with the second vehicle.

14. The method of claim 10, wherein the sensor data describing the environment surrounding the second vehicle comprises sensor readings of the second vehicle.

15. The method of claim 10, wherein the sensor data describing the environment surrounding the second vehicle comprises prediction results of processing of sensor readings of the second vehicle.

16. The method of claim 10, wherein the provision of the sensor data to the first vehicle occurs only upon determining the mismatch exceeds the threshold.

17. The method of claim 10, further comprising:
    identifying, based on sensor data describing the environment surrounding the first vehicle, the blind spot of the first vehicle, and
    requesting a vehicle management system, to provide to the first vehicle, the indication that the second vehicle is in the vicinity of the first vehicle, and that the second vehicle has a view of the identified blind spot of the first vehicle.

18. One or more non-transitory computer-readable media having stored thereon executable instructions to instruct a processor to:
    receive at a first vehicle an indication of a second vehicle determined to be in a vicinity of the first vehicle and determined to have a view of a blind spot of the first vehicle caused by obstruction,
    compute a first complexity score (CS) based on sensor data collected by the first vehicle, the first CS indicative of an environment surrounding the first vehicle,
    receive from the second vehicle a second CS computed from sensor data collected by the second vehicle, the second CS indicative of an environment surrounding the second vehicle;
    wherein each of the first CS and the second CS includes, for the first vehicle and the second vehicle respectively: a number of vulnerable road users, a number of active vehicles, a number of static obstacles, an occupancy of a free-space grid, a percentage of obstructed motion grid, a position of each of one or more vehicles, and a lane direction of each of one or more vehicles;
    determine whether a mismatch between the first CS and the second CS exceeds a threshold, and
    upon determining that the mismatch exceeds the threshold:
        cause the second vehicle to provide, to the first vehicle, sensor data describing the environment surrounding the second vehicle to account for the mismatch; and
        determine and execute a driving maneuver based on the sensor data provided by the second vehicle.

19. The one or more non-transitory computer-readable media of claim 18, wherein the executable instructions are to further instruct the processor to:
    provide, to a vehicle management system, information identifying a location of the blind spot of the first vehicle.

20. The one or more non-transitory computer-readable media of claim 19, wherein the information identifying the location comprises one or more of: Global Positioning System coordinates of the blind spot, identification of one or more sensors of a sensor suit of the first vehicle encountering the blind spot, and location of the blind spot relative to a position of the first vehicle.

* * * * *